United States Patent [19]

Huston

[11] Patent Number: 4,965,040
[45] Date of Patent: Oct. 23, 1990

[54] MAXIMUM/MINIMUM ASYMMETRIC ROD DETECTION

[75] Inventor: John T. Huston, Lancaster, Ohio

[73] Assignee: The Babcock & Wilcox Company, New Orleans, La.

[21] Appl. No.: 337,506

[22] Filed: Apr. 13, 1989

[51] Int. Cl.$^5$ .................. G21C 7/36; G21C 17/00
[52] U.S. Cl. ............................ 376/236; 376/258
[58] Field of Search ............... 376/236, 237, 238, 258, 376/219, 215

[56] References Cited

U.S. PATENT DOCUMENTS

| | | | |
|---|---|---|---|
| 3,212,977 | 10/1965 | Campbell | 376/236 |
| 3,391,058 | 7/1968 | Gibert | 376/236 |
| 3,706,921 | 12/1972 | Rosen | 376/219 |
| 3,899,727 | 8/1975 | Thayer | 376/219 |
| 3,979,255 | 9/1976 | Bulgier et al. | 376/236 |
| 4,201,940 | 5/1980 | Deardenne | 376/258 |
| 4,282,061 | 8/1981 | Sakurai et al. | 376/236 |
| 4,568,513 | 2/1986 | Book et al. | 376/258 |
| 4,714,926 | 12/1987 | Neuner et al. | 376/258 |

*Primary Examiner*—Harvey E. Behrend
*Attorney, Agent, or Firm*—Vytas R. Matas; Robert J. Edwards; Daniel S. Kalka

[57] ABSTRACT

A system for determining the relative positions of control rods within a nuclear reactor is disclosed. When the position signal associated with the highest control rod in a group exceeds the position signal associated with the lowest control rod in the same group by more than a predetermined limit, an alarm and a fault indicator are activated.

6 Claims, 2 Drawing Sheets

MAXIMUM/MINIMUM ASYMMETRIC ROD DETECTION

TECHNICAL FIELD

The present invention relates, in general, to determining the position of a control rod within a nuclear reactor and, more particularly, to determining the position of the control rod relative to other control rods within a rod group.

BACKGROUND ART

Various techniques are available for determining the relative position of a control rod within a nuclear reactor. Such techniques can utilize ultrasonic methods or magnetic approaches for determining the position of the control rod. Magnetic approaches typically depend upon the magnetic structure of the control rod, or the inductive coupling between the control rod and the magnetic windings of the measuring device, or the change in magnetic flux resulting from control rod movement. Such approaches are directed to detecting the relative position of a single control rod rather than to comparing the relative position of the control rods within a group. The comparison of the relative position of the control rods within a group can reveal the existence of an alarm or fault condition.

Because of the foregoing, it has become desirable to develop a method for comparing the relative position of control rods within a control rod group to determine if an alarm or fault condition exists within the nuclear reactor.

SUMMARY OF THE INVENTION

The present invention solves the problems associated with the prior art and other problems by providing a system for determining the relative position of each control rod in a group of control rods. This is accomplished by providing each control rod with a position indicating device which produces a signal indicative of the position of that control rod within the group. The position signal of the highest control rod in the group is subtracted from the position signal of the lowest control rod in the group and if the difference exceeds a predetermined limit, an alarm and a fault indicator are activated.

DESCRIPTION OF THE PREFERRED EMBODIMENT

Figure 1:
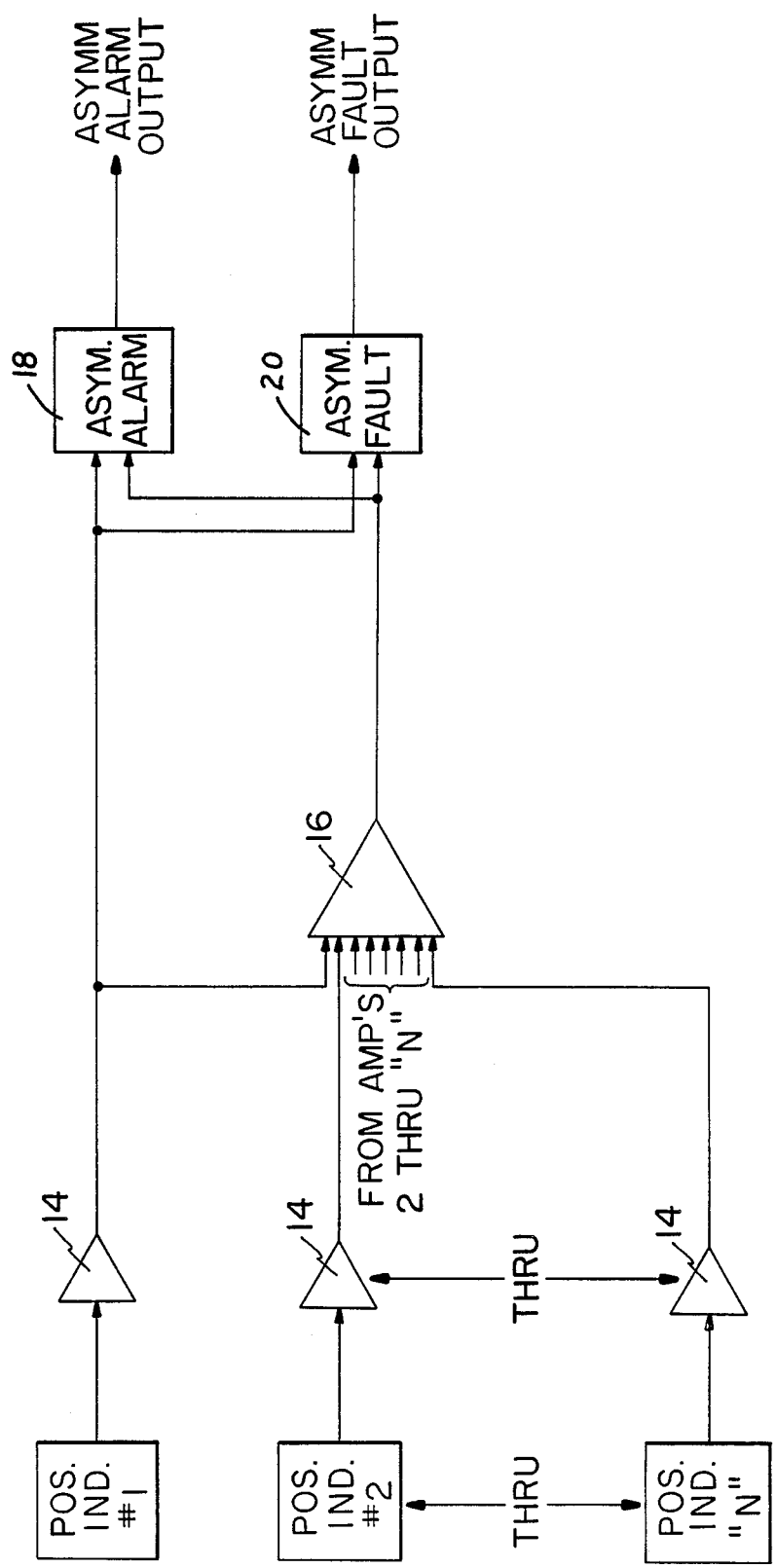
FIG. 1 is a schematic diagram of the asymmetric control rod detection system of the present invention.

Referring now to the drawings where the illustrations are for the purpose of describing the preferred embodiment of the present invention and are not intended to limit the invention hereto, FIG. 1 is a schematic diagram of the detection system 10 of the present invention. The detection system 10 includes a plurality of position indicators 12, each connected to a control rod drive mechanism (not shown), an amplifier 14 connected to each of the position indicators 12, a group amplifier 16 whose inputs are connected to the output from each of the amplifiers 14, and an asymmetric alarm device 18 and an asymmetric fault device 20 connected to the outputs of each of the amplifiers 14 and the group amplifier 16.

Figure 2:
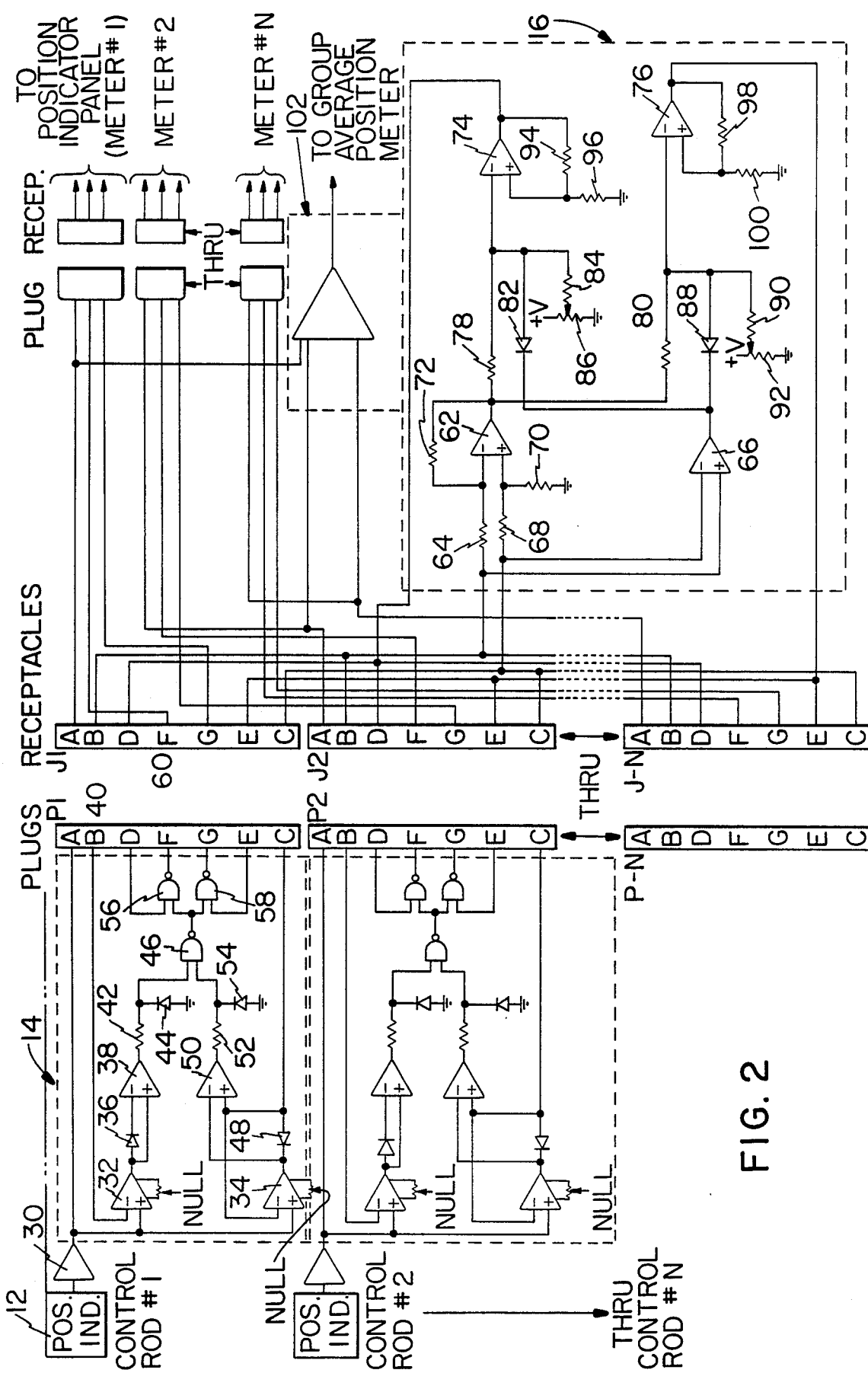
FIG. 2 is a circuit diagram of the system disclosed in FIG. 1 showing the circuit elements contained therein.

Referring now to FIG. 2, the detection system 10 is illustrated along with details of the circuitry for the componentry illustrated in FIG. 1 and the interconnection between same. The output of each position indicator 12 is connected to the input to a buffer 30 whose output is connected to the positive inputs to operational amplifiers 32 and 34 within amplifier 14. The output of operational amplifier 32 is connected to the anode of a diode 36 and to the positive input to an operational amplifier 38. The cathode of diode 36 is connected to the negative input to operational amplifiers 32 and 38 and to pin B on plug 40. The output of operational amplifier 38 is connected to ground via a resistor 42 and a diode 44 whose junction is connected to one input to a NAND gate 46. The output of operational amplifier 34 is connected to the cathode of a diode 48 and to the negative input to an operational amplifier 50. The anode of the diode 48 is connected to the negative input to operational amplifier 34, to the positive input to operational amplifier 50 and to pin C on plug 40. The output of operational amplifier 50 is connected to ground via a resistor 52 and a diode 54 whose junction is connected to the other input to NAND gate 46. The output of NAND gate 46 is connected to the inputs to NAND gates 56 and 58 whose outputs are connected to pins F and G, respectively, on plug 40. In this manner, the "maximum" rod position signal appears on pin B, the "minimum" rod position signal appears on pin C, the asymmetric alarm signal appears on pin F, and the asymmetric fault detection signal appears on pin G of plug 40.

The group amplifier 16 is connected to receptacle 60 having contacts which correspond with the pins in plug 40. Contact B of receptacle 60, which transmits the "maximum" rod position signal from amplifier 14, is connected to the negative input to an operational amplifier 62 via a resistor 64 and to the positive input to an operational amplifier 66. Contact C of receptacle 60, which transmits the "minimum" rod position signal from amplifier 14, is connected to the positive input to operational amplifier 62 via a voltage divider arrangement consisting of resistors 68 and 70 connected to ground and to the negative input to operational amplifier 66. The output of operational amplifier 62 is connected to its negative input via a resistor 72 and to operational amplifiers 74 and 76 via resistors 78 and 80, respectively. The negative input to operational amplifier 74 is connected to the anode of a diode 82 and to ground via a resistor 84 and a potentiometer 86. The cathode of diode 82 is connected to the output of operational amplifier 66 and to the cathode of a diode 88. The anode of diode 88 is connected to the negative input to operational amplifier 76 and to ground via a resistor 90 and a potentiometer 92. The output of operational amplifier 74 is connected to its positive input via a resistor 94, and the positive input to this operational amplifier is connected to ground via a resistor 96. Similarly, the output of operational amplifier 76 is connected to its positive input via a resistor 98, and the positive input to this operational amplifier is connected to ground via a resistor 100. The output of operational amplifier 74, which represents the asymmetric alarm signal, is connected to contact D of receptacle 60, and the output of operational amplifier 76, which represents the asymmetric fault signal, is connected to contact E of receptacle 60. In this manner, the asymmetric alarm signal is connected to the other input to NAND gate 56, and the asymmetric fault signal is connected to the other input to NAND gate 58. The outputs of NAND gates 56 and 58 are connected to pins F and G, respectively, on plug 40 which, in turn, are connected to contacts F and G of receptacle 60. Contacts F and G of receptacle 60 are, in turn, connected to a position indicator panel (not shown). It should be noted that the output of buffer 30 is also connected to contact A of plug 40 which, in turn, is connected to contact A of receptacle 60 and to the input to a group averaging amplifier 102 whose output is connected to a group average position meter (not shown).

Operationally, a position indicator 12 and its associated buffer 30 provide a voltage representative of the position of its associated control rod to the positive inputs to operational amplifiers 32, 34 in amplifier 14 and to group averaging amplifier 102. Group averaging amplifier 102 produces an output voltage that is representative of the average of all input voltages applied thereto, and this output voltage can be indicated on a meter (not shown). The voltage so indicated is representative of the average position of all the control rods in a particular control rod group. Operational amplifier 32 is "nulled" to provide a positive output voltage for the relative position of its associated control rod. Diode 36, which is connected to the output of operational amplifier 32, isolates the output of this operational amplifier from any external signals. The output of diode 36 is also connected to the negative input to operational amplifier 32 and to the outputs of all similar diodes 36 in the other amplifiers 14 for the other control rods within the group. Thus, the actual feedback signal to the negative input to each operational amplifier 32 is the voltage of the most positive (the highest) control rod, and all diodes 36 are back biased except the diode 36 in the amplifier 14 associated with the highest control rod. The outputs of all diodes 36 are also connected to the negative input to operational amplifier 62 and to the positive input to operational amplifier 66 in the group amplifier 16. Thus, the voltage of the most positive (the highest) control rod is also applied to an input on operational amplifiers 62 and 66. Similarly, operational amplifier 34 is "nulled" to provide a negative output voltage for the relative position of its associated control rod. Diode 48, which is connected to the output of operational amplifier 34, isolates the output of this operational amplifier from any external signals. The anode of diode 48 is also connected to the negative input to operational amplifier 34 and to the anodes of all similar diodes 48 in the other amplifiers 14 for the other control rods within the group. Thus, the actual feedback signal to the negative input to all operational amplifiers 34 is the voltage of the most negative (the lowest) control rod and all diodes 48 are back biased except the diode 48 in the amplifier 14 associated with the lowest control rod. The anodes of the diodes 48 are also connected to the positive input to operational amplifier 62 and to the negative input to operational amplifiers 66 in the group amplifier 16. Thus, the voltage of the most negative (the lowest) control rod is also applied to the remaining input on operational amplifier 62 and 66.

Operational amplifier 62 within the group amplifier 16 subtracts the most positive voltage from the diodes 36 from the most negative voltage from the diodes 48 producing a negative output voltage which is representative of the difference of the input voltages thereto. Resistors 78, 84 and potentiometer 86 act as a voltage divider applying a predetermined voltage to the negative input to operational amplifier 74 which is wired as an inverting amplifier. When the difference between the input voltages to operational amplifier 62 produces an output voltage which exceeds the predetermined voltage produced by resistors 78, 84 and potentiometer 86, operational amplifier 74 produces a positive output which is known as the asymmetric "alarm" output.

The circuitry comprising operational amplifier 66, resistors 80, 90, potentiometer 92 and operational amplifier 76 operates in a similar manner producing a positive output voltage when the difference between the input voltages to operational amplifier 66 exceed a predetermined voltage produced by resistors 80, 90 and potentiometer 92. The output voltage produced by operational amplifier 76 is representative of an asymmetric "fault" condition.

If a circuit component fails and the maximum positive output voltage from diodes 36 decreases below the output voltage from diodes 48, the output voltage of operational amplifier 66 will become negative causing both operational amplifiers 74 and 76 to produce a positive output voltage. This results in both an asymmetric alarm signal and an asymmetric fault signal being produced. Thus, the detection system 10 is fail safe.

As previously indicated, all diodes 36 and diodes 48 in amplifiers 14 are back biased except diode 36 associated with the highest control rod within a group and diode 48 associated with the lowest control rod within the same group. The remaining diodes 36 and 48 cause their respective operational amplifier 38, 50 to produce a positive output voltage. The positive output voltages produced by operational amplifiers 38 and 50 are applied as inputs to NAND gate 46. When both diode 36 and diode 48 in an amplifier 14 are back biased, operational amplifiers 38 and 50 produce a positive output voltage and NAND gate 46 produces a zero output. If either of the foregoing diodes are forward biased (in a control rod group, diode 36 associated with the highest control rod and diode 48 associated with the lowest control rod will be forward biased), then NAND gate 46 will have one zero input and will produce a digital 1 output. This digital 1 output is applied to the inputs to both NAND gates 56 and 58. If NAND gate 56 is also receiving a positive alarm signal from operational amplifier 74 on its other input, its output will be zero which can be shown on a meter so as to identify the control rod involved. Similarly, if NAND gate 58 is also receiving a positive "fault" signal from operational amplifier 76 on its other input, NAND gate 58 will produce a zero output which can be shown on a meter so as to identify the control rod involved. Resistors 42 and 52 in conjunction with diodes 44 and 54, respectively, prevent operational amplifiers 38 and 50, respectively, from over driving the inputs to NAND gate 46. In essence, the latter circuit arrangement is a safety circuit.

Certain modifications and improvements will occur to those skilled in the art upon reading the foregoing. It should be understood that all such modifications and improvements have been deleted herein for the sake of conciseness and readability, but are properly within the scope of the following claims.

I claim:

1. A system for determining the relative position of each control rod within a control rod group in a nuclear reactor, said control rod group having at least three control rods therein, comprising:

means for producing a signal representative of a position of each control rod within the control rod group in the nuclear reactor;

means for establishing a signal representative of the highest position of a control rod in the control rod group in the nuclear reactor;

means for establishing a signal representative of the lowest position of a control rod in the control rod group in the nuclear reactor;

means for determining a difference between said signal representative of the position of the highest control rod and the signal representative of the position of the lowest control rod;

means for establishing a predetermined limit for said difference between said signal representative of the position of the highest control rod and said signal representative of the position of the lowest control rod; and means for comparing said difference between said signals with said predetermined limit, said comparing means producing an output signal when said difference between said signals exceeds said predetermined limit.

2. The system as defined in claim 1 further including means for identifying the control rod having a position which causes said difference between said signals to exceed said predetermined limit.

3. The system as defined in claim 1 further including means for determining the average position of all the control rods in the control rod group.

4. The system as defined in claim 3 further including means for displaying the average position of all the control rods in the control rod group.

5. The system as defined in claim 1 wherein said limit establishing means is adjustable permitting said predetermined limit to be varied.

6. The system as defined in claim 1, further comprising means for providing an alarm indicative of a circuit component failure.

* * * * *